(12) United States Patent
McCarthy

(10) Patent No.: US 12,438,380 B2
(45) Date of Patent: Oct. 7, 2025

(54) DATA CENTER SYSTEM AND METHOD OF OPERATING THE DATA CENTER SYSTEM

(71) Applicant: NLIGHTEN HQ B.V., Schiphol-Rijk (NL)

(72) Inventor: Chad McCarthy, The Hague (NL)

(73) Assignee: NLIGHTEN HQ B.V., The Hague (NL)

( * ) Notice: Subject to any disclaimer, the term of this patent is extended or adjusted under 35 U.S.C. 154(b) by 211 days.

(21) Appl. No.: 18/173,189

(22) Filed: Feb. 23, 2023

(65) Prior Publication Data

US 2023/0268743 A1 Aug. 24, 2023

(30) Foreign Application Priority Data

Feb. 24, 2022 (EP) ..................................... 22158675

(51) Int. Cl.
*H02J 3/46* (2006.01)
*H02J 3/32* (2006.01)
*H02J 3/38* (2006.01)

(52) U.S. Cl.
CPC .............. *H02J 3/466* (2020.01); *H02J 3/32* (2013.01); *H02J 3/381* (2013.01); *H02J 2203/10* (2020.01); *H02J 2300/10* (2020.01); *H02J 2300/30* (2020.01); *H02J 2300/40* (2020.01)

(58) Field of Classification Search
None
See application file for complete search history.

(56) References Cited

U.S. PATENT DOCUMENTS

| | | | |
|---|---|---|---|
| 7,000,395 B2 * | 2/2006 | Wai | F01K 13/02 290/1 R |
| 9,559,521 B1 * | 1/2017 | King | H02J 9/06 |
| 10,340,693 B2 * | 7/2019 | Lansing, Jr. | H02J 3/28 |
| 11,846,393 B2 * | 12/2023 | Jorgenson | F17C 5/06 |
| 11,949,279 B2 * | 4/2024 | Cohn | F02B 63/044 |
| 12,009,669 B2 * | 6/2024 | Mitsunaga | H02J 3/46 |
| 12,040,620 B2 * | 7/2024 | Kumazawa | H02J 3/381 |
| 2003/0027023 A1 | 2/2003 | Dutil et al. | |
| 2004/0013923 A1 * | 1/2004 | Molter | H01M 8/0656 429/444 |

(Continued)

FOREIGN PATENT DOCUMENTS

| | | |
|---|---|---|
| CN | 104242442 | 12/2014 |
| WO | 2007018830 | 2/2007 |

*Primary Examiner* — Thomas J. Hiltunen
(74) *Attorney, Agent, or Firm* — JMB Davis Ben-David

(57) ABSTRACT

The invention relates to a data center system, comprising at least the following components: a data center, a power source module comprising a gas-powered electricity generator, and an energy conversion module, wherein the data center is connected to at least two prime-rated electricity sources, wherein a first electricity source is a grid and a second electricity source is the power source module that is connected to a gas network, to the data center and to the grid, wherein the energy conversion module is connected to a regenerative energy source and to the gas network, wherein the energy conversion module generates synthetic gas using electricity from the regenerative energy source, and to feed the generated gas into the gas network, wherein the system is configured to provide electricity from the power source module to the data center, such as to export power to the grid for stabilizing the grid.

8 Claims, 5 Drawing Sheets

(56) References Cited

U.S. PATENT DOCUMENTS

| | | | |
|---|---|---|---|
| 2008/0217998 A1* | 9/2008 | Parmley | H02J 7/35 307/65 |
| 2011/0215640 A1* | 9/2011 | Donnelly | H02J 3/466 307/21 |
| 2015/0105923 A1 | 4/2015 | Beekmann et al. | |
| 2019/0036345 A1 | 1/2019 | Meszaros | |
| 2019/0079473 A1 | 3/2019 | Kumar | |
| 2019/0386491 A1* | 12/2019 | Ito | H01M 8/0606 |
| 2021/0363651 A1 | 11/2021 | Seymour et al. | |
| 2023/0102812 A1* | 3/2023 | Yoshida | H01M 8/04925 429/410 |
| 2023/0305587 A1* | 9/2023 | Thirumurthy | H02J 3/144 |

* cited by examiner

DATA CENTER SYSTEM AND METHOD OF OPERATING THE DATA CENTER SYSTEM

CROSS REFERENCE TO RELATED APPLICATIONS

Benefit is claimed to European Patent Application No. EP22158675.3, filed on Feb. 24, 2022.

FIELD

The invention relates to a data center system, particularly a carbon-neutral data center system, a method for remodeling a conventional data center connected to the electricity grid as a first prime-rated electricity source as well as a method for controlling the data center system according to the invention.

BACKGROUND

Data centers are spaces which are designed to house and operate computer system, such as server and/or data storage networks, e.g. a cloud. Typically, data centers are comprised in dedicated rooms or buildings. Data centers require, on grounds of resilience, two independent power sources for provision with electricity. Data centers known in the art, are connected to the electricity grid (utility connection) as the prime-rated power source. The term 'prime-rated' in the context of the specification and as known by the skilled person particularly refers to power sources that are by design configured to provide electricity at full load for an unlimited number of hours per year. As a back-up power source, in case the electricity grid fails its supply function as a prime-rated source, the data centers comprise a standby rated power source.

The standby-rated source is configured to quickly generate electricity on demand, but only for a limited amount of time.

The standby-rated source is a fossil-fuel driven generator at the data center that is powered up, in case the electricity demand of the data center exceeds the supply capabilities of the electricity grid—typically in case of a power outage of the grid.

Under these operating conditions, data centers leave a large carbon-positive footprint and place a constant load burden on electricity grids, which have variable renewable generation capacities, which may periodically be insufficient to supply them with carbon neutral energy. The operating cost of a data center operating in this fashion correlates directly with energy prices of the prime rated source that may vary periodically with the capacity available, correlating in turn with stability requirements of the electricity grid.

SUMMARY

The invention is set out to provide a data center system to improve these problems.

The solution to this objective is provided by a system having the features of claim 1, as well as by a remodeling method and a method for controlling the system.

The system solves the problem according to the invention by being capable of operating in a net carbon neutral regime having a reduced dependency on the electricity grid as the sole prime-rated energy source and by presenting a load profile to the grid which correlates with electricity grid renewable generation capacity, improving effectivity of renewable sources and assisting the migration of utilities toward a carbon neutral operation.

Advantageous embodiments are disclosed in the following and in the dependent claims.

According to a first aspect of the invention, a data center system, particularly a carbon neutral data center system comprises at least the following components: a data center, a power source module, and an energy conversion module, wherein the data center is connected to at least two prime-rated electricity sources configured to provide electricity to the data center, wherein a first electricity source of the at least two prime-rated electricity sources is an electricity grid providing electricity to the data center and wherein a second electricity source of the at least two prime-rated electricity sources is the power source module, wherein the power source module comprises a gas-powered electricity generator to generate electricity from gas, wherein the power source module, particularly the gas-powered electricity generator is connected to a gas network, wherein the power source module is further connected to the data center as well as—via the data center, particularly only via an electric connection at the data center—to the electricity grid, wherein the energy conversion module is connected to a local regenerative energy source as well as to the gas network, wherein the energy conversion module is configured to generate synthetic gas, comprising or consisting of hydrogen and/or methane using electricity from the regenerative energy source, wherein the energy conversion module is configured to feed the generated synthetic gas into the gas network, characterized in that, the system is configured to provide electricity from the power source module and generated at the power source module to the data center, such as to reduce a load on the electricity grid, particularly to export power to the electricity grid and such that the data center is supplied by the at least two prime-rated electricity sources simultaneously.

The capability of the system to simultaneously supply the data center with electricity from two prime-rated electricity sources allows reducing a load exerted by the data center on the electricity grid, when the electricity from the power source module is provided to the data center and/or reducing a load from the electricity grid that may not be caused by the data center, therefore achieving a stabilizing effect on the electricity grid by supplying the electricity from the power source to the electricity grid via the data center. This kind of electricity export to the electricity grid allows for flexible grid stabilization.

According to another embodiment of the invention, the system comprises a grid battery configured to store and to instantaneously provide electricity to the electricity grid.

The grid battery may be an AC grid battery or a DC grid battery depending particularly on whether the gas-powered electricity generator provides AC or DC electricity. The grid battery particularly allows for an instantaneous provision of electricity during a start-up phase of the gas-powered electricity generator, during which the gas-powered electricity generator may not be capable to provide a required amount of electricity, e.g. to instantaneously stabilize the electricity grid or to provide electricity to the data center. The grid battery therefore may supplement or entirely provide the electricity required during said start-up phase.

According to another embodiment of the invention, the grid battery is connected to and/or comprised by the power source module, particularly such that the electricity from the battery is provided to the electricity grid from the power source module, particularly via the data center.

The system particularly comprises a plurality of power source modules, a plurality of energy conversion module as well as a plurality of data centers. Therefore, the following embodiments particularly also relate to a system having a plurality of at least one of the components.

Particularly, gas may be produced at several energy conversion modules, wherein the system comprises and operates a plurality of power source modules and data centers, wherein any amount of produced gas at the energy conversion modules may be consumed by the plurality of power source modules, particularly wherein a number of energy conversion modules may be smaller than a number power source modules.

Production of gas at the energy conversion module and consumption of gas at the power source module may not occur concurrently but during opposite grid circumstances. Gas production may occur during an abundance of grid connected renewable generation capacity whereby gas consumption may occur during transient deficits in grid connected renewable generation capacity.

The problem according to the invention is solved by the proposed system, which on the one hand employs two prime-rated electricity sources for electricity supply of the data center, wherein in particular the second prime-rated energy source may be used for grid stabilization and/or energy demand management of the data center simultaneously. Both prime-rated energy sources are capable of powering the data center for extended, essentially unlimited periods at constant or varying loads.

The system creates a synergetic effect between the data center's varying energy demand and the oftentimes weather dependent renewable energy generation capacity of the electricity grid. As such, the system allows to lever the data center to assist grid stability in times of limited regenerative electricity generation and use the energy conversion module to reduce curtailment of renewable sources during excesses. Therefore, the data center system according to the invention increases the annual proportion energy produced from regenerative sources. The invention connects the technical field of data center operation with the energy-producing sector to provide a system that is operated in a carbon neutral fashion.

The data center system according to the invention is capable to run completely carbon neutral, particularly in case a sufficient amount of gas is generated at the energy conversion module and/or a sufficient amount of energy is stored in the grid battery, as will be detailed in some following embodiments.

The system can be considered to comprise at least two main functional modules; one for the supply of synthetic gas—the energy conversion module—and one (the power source module) for local supply of electricity from the conversion of gas into electricity and/or from the grid battery, which may have been charged during a time of abundance of renewable grid sources, for powering the data center or for stabilizing the grid. This allows maintaining a carbon neutral balance, in case the amount of generated gas by the energy conversion module is not exceeded by the gas consumption of the power source module and in case sufficient energy from carbon neutral sources is stored in the grid battery to cover transient periods. These functional modules may be split into physically separate and particularly pre-manufactured facilities. A respective plant within these facilities may be pre-designed and offsite prefabricated. The facilities may take the form of weatherproof containers for external placement or on skids for placement within an existing building shell.

Within each facility configuration options are available depending on the local gas infrastructure requirements and the specification of the data center. Particularly, the energy conversion module is not necessarily collocated with the data center unless there is a local regenerative energy source close by as well. Typically, the energy conversion module may be collocated with the regenerative energy source. The amount of synthetic and thus carbon neutral gas generated by the energy conversion module, is particularly in proportion to an aggregate demand for electricity generation in the power source module.

For gas networks comprising gas with 0%-25% hydrogen, the power source module may be configured to either run directly on the gas from the gas network, e.g. by burning the gas, e.g. in a reciprocating gas engine and producing AC electricity, or by extracting the pure hydrogen from the gas and by converting the extracted hydrogen e.g. by means of a fuels cell and producing DC electricity, or by combustion of the high purity hydrogen in a reciprocating gas engine. The latter mode of operation using high-purity hydrogen, may also assist in stabilization of hydrogen levels present in the gas network. The stabilizing effect of the system therefore comprises both gas network and electricity grid operations.

The gas networks may provide a blended gas comprising hydrogen in the amount of 0% to 25% and the corresponding remaining portion consisting of methane.

The gas from the gas network may be filtered by a filter in order to extract the hydrogen. In case the extracted hydrogen is combusted in the power source module, e.g. by a reciprocating gas engine, the filter may be a membrane filter, particularly a membrane filter extracting hydrogen at a purity of at least 90%, which is sufficient for the reciprocating gas engine. In case a fuel cell is to be applied, the filter may comprise an additional filter, e.g. a pressure swing adsorption filter for increasing the purity of the extracted hydrogen.

The term 'regenerative energy source' in the context of the current specification particularly refers to a power source that generates electricity from regenerative sources, such as wind, sun light, tides and/or biogas. Therefore, the regenerative energy source may consist of or may comprise a wind turbine, a water turbine, a tidal power plant, a solar-thermal, a geo-thermal and/or solar module or a combination thereof. The regenerative energy source may also comprise a plurality of wind turbines, e.g. in form of a wind park, a plurality of solar module, e.g. in form of a solar module park, etc.

The term 'local' in connection with the regenerative energy source particularly refers to the energy conversion module to be arranged in a proximity of the regenerative energy source, particularly such that the generated electricity of the regenerative energy source is not transported across distances along which electrical energy losses or transmission and distribution charges become prohibitive. The proximity may be in the range of 0 km to 100 km, more particularly in the range of 0 km to 20 km or in the range 0 km to 10 km. Such proximity may be understood as collocated in the context of the current specification, when relating to the energy conversion module and the regenerative energy source.

It is noted that the regenerative energy sources may not be comprised by the energy conversion module, but the energy conversion module may be located in the proximity of such power sources.

The energy conversion module may be configured for an electrolyzer power of between 2 MW and 20 MW, resulting in a net power equivalent gas production in the range of about 1 MW to 10 MW.

The term 'gas network' particularly refers to a gas network that is provided with gas from many gas sources. The gas network is particularly configured to take in gas from the energy conversion module, to store and to transport the gas, and to provide the power source module with gas (not necessary with the same gas that has been produced by the energy conversion module). As such, the gas network may be considered as a delocalized gas reservoir.

The gas in the gas network, may consist of or comprise methane and/or hydrogen. It is common that gas networks carry a mix or a blend of methane and hydrogen and are fed by gas from various sources.

The term "electricity grid" particularly refers to an interconnected network for electricity delivery from producers to consumers. The grid may extend over the area of several square kilometers and may cover a whole country. The electricity grid may comprise a plurality of electricity grids that are interconnected and synchronized.

According to another embodiment of the invention, the energy conversion module is configured to use electricity generated from regenerative energy sources only.

The energy conversion module is configured to generate synthetic gas, comprising hydrogen and/or methane. Further, according to another embodiment of the invention, the synthetic gas from the energy conversion module consists of hydrogen or methane. Which kind of synthetic gas the energy conversion module generates depends on its specific layout and configuration of the energy conversion module.

Particularly, the energy conversion module is configured to intermittently generate gas, particularly in case an energy surplus is generated by the regenerative energy source(s). This way, the system inherently has the capability to produce synthetic gas exclusively from carbon neutral electricity sources.

The power source module, is configured to burn or to convert the gas from the gas network into electricity on demand but also, possibly, in a prime-rated fashion. In order to maintain a carbon neutral energy production, the amount of gas burned or converted may correspond to the amount of gas fed into and stored within the gas network by the energy conversion module.

In this context is it noted that the term 'gas' particularly excludes the notion of diesel, gasoline, kerosine or a similar fuel that is liquid at room temperature and atmospheric pressure.

According to another embodiment of the invention, the data center further comprises a standby electricity source in form of an uninterruptible power source (UPS). The UPS may be a chargeable battery assembly.

Further, particularly, in contrast to conventional data center systems, the system according to the invention is devoid of a liquid fuel burning engine configured, connected and used as a standby energy source, for the data center. The term 'fuel burning' is to be understood particularly in contrast to the notion provided for the term 'gas', i.e. the invention is devoid of a generator designed for burning a fuel that is liquid under normal conditions, i.e. room temperature and atmospheric pressure.

According to another embodiment of the invention, the system comprises a local gas storage connected to the power source module, particularly wherein the local gas storage is configured to provide gas stored in the local gas storage to the power source module, particularly in the event of a gas distribution outage or failure of the gas network. The gas stored in the local gas storage may be stored in liquid and/or pressurized form.

Thus, the data center system according to the invention, particularly while being devoid of an operationally connected liquid fuel burning generator, this embodiment allows storing fuel in liquid state (e.g. propane, butane). This may be suitable for locations where gas and grid failures occur concurrently and an extended autonomy period from the gas network is required.

The local gas storage may be configured to store methane sufficient to run the power source module for about 4 to 12 hours under full load. It is possible, that this capacity is extended, particularly for example, when the local gas storage comprises Propane and/or Butane (here the capacity may be as high as 48 h under full load).

The gas from the local gas storage is provided to the gas-powered electricity generator in gaseous form.

The local gas storage may be comprised by the power source module. This embodiment allows for a fail-safe generation of electricity for the second prime-rated electricity source, i.e. the power source module. The local gas storage is particularly a local facility. This is in contrast to the gas network that is not considered a local facility in the context of the current specification.

According to another embodiment of the invention, the energy conversion module is configured to use water from a water source. Further, the energy conversion module may be configured to use carbon dioxide and/or carbon monoxide from a carbon dioxide/monoxide source that is connected or may be comprised by the energy conversion module for generating synthetic gas. When the energy conversion module is designed to use the carbon dioxide, the synthetic gas generated at the energy conversion module is methane.

Particularly, the carbon dioxide source is a direct carbon capture facility, and/or a biogas facility generating biogas, particularly wherein in case the carbon dioxide source is the biogas facility, biogas obtained from the biogas facility is filtered for carbon dioxide and methane, wherein the filtered methane is provided to the gas network directly.

Filtering of the biogas may be achieved in the energy conversion module or externally.

According to another embodiment of the invention, the electricity is provided from the power source module via the data center synchronously to the electricity provided by the electricity grid.

The term "synchronously" particularly refers to AC electricity that is in phase with the electricity from the electricity grid.

The synchronized electricity allows for an efficient electricity provision to the data center and/or the electricity grid. Depending on the kind of electricity generated by the power source module, i.e. AC or DC electricity, the data center may comprise various components for transforming the electricity from one kind into the other.

In case the electricity provided by the power source module is AC, the power source module may be connected to the data center such that the electricity can be provided in a synchronous manner to the data center. This allows reducing the load on and/or stabilizing the electricity grid. Particularly, grid stabilization is achieved by routing the electricity via the data center.

The connection to the data center may be controllable by a switch for connecting and disconnecting the power source module from the data center.

In case the electricity provided to by the power source module is DC, the data center comprises a DC-AC converter or a bidirectional converter for converting the electricity into AC that is synchronous to the electricity from the electricity grid and that may serve for grid stabilization.

In this embodiment the grid battery may be a DC battery, which may be comprised by the UPS or may be arranged as a separate DC battery elsewhere in the system. The grid battery may nonetheless be connected to the power source module e.g. via a DC-rail.

The conversion may take place in case the system is operated for grid stabilization. Depending on the data center components, it is possible to use the DC electricity directly for electricity supply for the data center components (rather than for grid stabilization). In case the components require AC currents, the DC electricity may be converted accordingly, preferably also in synch with the electricity from the electricity grid, to avoid phase shifts.

The DC electricity may also be connected to charge the UPS.

In order to facilitate the connection to the electricity grid and the power source module, the data center may comprise two electricity supply connections.

According to another embodiment of the invention, the system is configured to provide the electricity from the power source module to the data center, particularly only to the data center, particularly in case an amount of generated gas by the energy conversion module is equal to or greater than an amount of gas required to generate the electricity by the power source module, particularly wherein no electricity is provided in case the generated amount of gas is less than the amount of gas required to provide the electricity by the power source module.

The term 'amount' in the context of gas or electricity particularly refers to an energy equivalent, e.g. measured in units of MWh, that is comprised in the gas and/or the electricity. That is, the system according to this embodiment is configured and adapted to convert energy to the same amount from regenerative sources (by way of the energy conversion module) into gas that is fed into the gas network, and subsequently, e.g. at a different time, pending the required conditions, convert the same amount of gas into electricity at the power source module.

This embodiment allows for a net carbon neutral electricity production in the context of the data center system and grid stabilization.

According to another embodiment of the invention, the system is configured to activate the power source module based on estimated or calculated amount of gas or energy equivalent that is available for electricity generation to the power source module, particularly wherein said amount of gas is determined from or equals to a generated amount of gas or its energy equivalent processed and fed into the gas network by the energy conversion module, particularly such that the electricity generated by the power source module is carbon neutral.

The power source module may be configured to produce an electrical power rating of 0.5 MW to 2.5 MW per module depending on the size and configuration of the data center supplied.

The term 'activate' in the context of the power source module particularly refers to the process of initiating generation and provision of electricity to the data center and/or the electricity grid.

Further, the system may be configured to activate the power source module based on an available volume of regeneratively produced amount of gas at the energy conversion module that may be converted to electricity at the power source module, particularly in combination with an amount of energy from carbon neutral sources stored in the grid battery available for export to the grid for stabilization.

This allows operating the system in a cost-efficient manner, particularly as the system is configured to convert the produced green gas into electricity at varying time points and at varying rates of gas production and/or consumption, and particularly as the system is configured to charge the grid battery during surpluses in renewable energy and return electricity when the grid requires stabilization, e.g. via the grid battery and/or the gas-powered electricity generator.

The term 'green gas' in the context of the current specification particularly refers to gas produced by the energy conversion module using the electricity from the regenerative energy source and particularly further, carbon dioxide from a direct carbon capture facility and/or biogas.

The production of electricity at the power source module may take place only in case there is an available volume of gas produced at the energy conversion module available to the power source module to ensure the neutral carbon footprint operation of the system over an operating period. Production of gas at the conversion module and conversion to electricity at the power source module may take place at different times during day month or year.

According to another embodiment of the invention, the system is configured to activate the power source module and to provide the electricity from the power source module to the data center, particularly only to the data center
    in case the electricity grid fails to provide the electricity to the data center, e.g. in times of a grid outage, or in case the electricity grid fails to meet an energy demand, e.g. in form of an electricity demand of the data center; and/or
    in case the amount of generated gas, e.g. measured in an energy equivalent, from the energy conversion module is greater than the amount of consumed gas, measured in an energy equivalent, by the power source module.

In the latter case the generated electricity may be used for example a) for renumeration of the generated electricity, b) for producing heat for a heat recovery system, and/or c) to reduce a load from the electricity grid.

This embodiment discloses two distinct operational modes of the system that allow the system to make efficient use of regenerative energies.

In other words, the system is configured to control the power source module to use gas from the gas network and/or the local gas storage only to the amount of synthetic gas that has been generated or fed by the energy conversion module into the gas network such that a net amount of converted gas is on average zero and as the energy conversion module has a carbon negative record for gas production, a net carbon emission of the system is zero when the gas is converted back into electricity and consumed.

According to another embodiment of the invention, the system is configured to determine and to control, when and particularly to what amount the energy conversion module converts electricity from the local regenerative energy source to gas and/or when and particularly to what amount to feed the generated gas into the gas network.

This embodiment allows the system to autonomously run the energy management from conversion to consumption. For controlling this process, the system may comprise a control system. The control system may be wireless and/or cable-based connected to the components of the system, wherein the control system is configured to receive information from the components, particularly as well as from the electricity grid, the regenerative energy source and the gas network, and to issue control commands to the components for controlling the components.

The rules according to which the energy conversion module produces gas may be governed by a surplus amount of electricity generated at the regenerative energy source. The latter being often-times dependent on weather or other external conditions.

According to another embodiment of the invention, the energy conversion module comprises a methanation plant configured to convert hydrogen to methane, wherein said methane is fed into the gas network.

According to another embodiment of the invention, the energy conversion module comprises an electrolyzer that is configured to convert electricity received from the regenerative energy source to hydrogen. Particularly, the electrolyzer is connected to a water source, such as a water network, supplying the electrolyzer with water for electrolysis. The hydrogen may be fed directly into the gas network or is further processed by the methanation plant as disclosed in the following embodiment.

According to another embodiment of the invention, the methanation plant is connected to the electrolyzer, such that the hydrogen generated by the electrolyzer is converted by the methanation plant into methane. For this purpose, the methanation plant may be configured to use carbon dioxide and/or carbon monoxide from a corresponding carbon dioxide/monoxide source, such as a direct capture facility, for methane production. Methane produced in this fashion has a negative carbon footprint.

Particularly, the electrolyzer and/or the methanation plant are powered by the electricity from the regenerative source.

According to another embodiment of the invention, the energy conversion module is connected to a biogas facility, particularly wherein the biogas consists of methane and carbon dioxide, wherein the biogas methane is filtered off and fed into the gas network and the carbon dioxide is provided to the methanation plant.

According to another embodiment of the invention, the methanation plant is connected to the carbon dioxide source, wherein said carbon dioxide source may be a carbon capturing facility, that is configured to capture carbon dioxide from the atmosphere, particularly to directly capture the carbon dioxide from the atmosphere.

According to another embodiment of the invention, the power source module, particularly the gas-powered electricity generator comprises a reciprocating gas engine configured to burn gas for example natural or synthetic natural gas provided to the power source module to generate electricity, particularly wherein said electricity is AC electricity, particularly wherein the gas is provided by the gas network and/or the local gas storage, particularly wherein the reciprocating gas engine is configured and designed to indiscriminately burn, e.g. combust gas comprising or consisting of methane, hydrogen and/or a blend of methane and hydrogen, particularly a blend comprising up to 25% hydrogen. Moreover, the reciprocating gas engine may further be configured to combust liquified petroleum gas (LPG) in gaseous form, comprising or consisting of butane and/or propane. The latter may be stored on the local gas storage. The gas-powered electricity generator may consist of the reciprocating gas engine.

According to another embodiment of the invention, the grid battery is an AC grid battery configured to operate synchronously with the reciprocating gas engine. This embodiment allows for a parallel use of the grid battery and the reciprocating gas engine.

The reciprocating gas engine is a cost-efficient electricity generator that can be activated and deactivated on demand, while the grid battery may provide immediate electricity/power for grid stabilization, the reciprocating engine, once started, can run for an essentially unlimited timespan.

According to another embodiment of the invention, the power source module, particularly the gas-powered electricity generator comprises a fuel cell configured to convert gas into electricity. The gas-powered electricity generator may consist of the fuel cell.

This embodiment is configured to produce DC electricity. Fuel cells allow efficient conversion of gas into electricity and eliminate much vibration and noise emissions, as fuel cells do not comprise moving parts, in contrast to a reciprocating gas engine.

According to another embodiment of the invention, the gas provided to the fuel cell consists of hydrogen, particularly wherein the fuel cell is a proton-exchange membrane fuel cell PEMFC—also known as polymer electrolyte membrane fuel cell—wherein the hydrogen is generated and provided from the energy conversion module, particularly from the electrolyzer of the energy conversion module to the fuel cell, provided from the local gas storage, wherein the local gas storage is a hydrogen gas storage, provided from a methane reformer comprised by the power source module, wherein the methane reformer is connected to the gas network and configured to generate hydrogen from methane provided by the gas network, and/or provided from a filter assembly comprising a membrane filter combined with a pressure swing adsorption filter (PSA filter) connected to the gas network and configured to separate hydrogen from a blended hydrogen-methane gas mixture provided by the gas network.

In case the hydrogen is provided from the methane reformer, the hydrogen is obtained from methane. Further, the methane reformer may be configured to produce carbon dioxide and to receive water from a water source.

Particularly, the methane reformer or the combined membrane and PSA filter is further connected to the fuel cell so as to provide the fuel cell with hydrogen generated by the methane reformer or the combined membrane and PSA filter.

This embodiment allows to operate a PEMFC as a power source with hydrogen obtained from different sources.

According to another embodiment of the invention, the fuel cell is an integrated fuel cell assembly that is configured to convert methane to hydrogen, particularly to pure hydrogen for producing electricity.

This embodiment allows for using gas networks transporting methane or hydrogen or a blend of methane and hydrogen in combination with a fuel cell.

According to another embodiment of the invention, the power source module is configured to generate DC electricity and to supply the DC electricity to the data center.

The advantages of DC and AC electricity connection to the data center have been elaborated in previous embodiments already. The DC electricity generation is particularly efficient in combination with a fuel cell.

According to another embodiment of the invention, the data center comprises an uninterruptible power source (UPS), particularly comprising a battery assembly, wherein the UPS is connected to the power source module, such that the power source module provides the UPS with electricity for charging and such that the UPS supports the fuel cell transiently for sudden changes in load and export of electricity to the grid. The latter allows the grid battery to be included in the UPS.

This embodiment provides synergistic effects for power source modules comprising a fuel cell, as the electricity produced by fuels cells does not need to be rectified for charging the UPS.

Therefore, depending on the kind of electricity (AC or DC) provided by the power source module, the electricity may be rectified.

It is advantageous to locate the UPS in the data center rather than in the power source module, particularly as this allows a common and unified construction layout for the data center, as it may be designed for both kind of power source modules—the ones that provide DC electricity and the ones that provide AC electricity.

According to another embodiment of the invention, the data center is configured to convert DC electricity to AC electricity for coupling to the electricity grid, such as to reduce a load on the electricity grid and/or to feed AC electricity into the electricity grid to stabilizing effect. In this embodiment, the UPS may transiently be used to partially or fully support the fuel cell to reduce a load on the electricity grid.

Particularly, the AC electricity is converted such that is synchronous with the AC electricity provided by the electricity grid.

According to another embodiment of the invention, the system comprises a grid battery configured to store and to instantaneously supply, particularly instantaneously and transiently supply electricity to the electricity grid, particularly during start-up times of the gas-powered electricity generator of the power source module.

For this purpose, the system may comprise a controller configured to control the grid battery's power supply to the electricity grid or the grid battery's charging times.

According to another embodiment of the invention, the grid battery is connected to and/or comprised by the power source module.

According to another embodiment of the invention, the the grid battery (14) is comprised by the UPS.

According to another embodiment of the invention, the power source module is comprised in a first facility, such as a first container or a first pod local to the data center, wherein the energy conversion module is comprised in a second facility, such as a second container or a second pod, particularly wherein the control system is configured to control the plurality of components.

The term 'local' in the context of the location of the power source module and the data center particularly refers to a vicinity that may be in a range of up to 2 km, particularly in the range of up to 1 km or in direct vicinity e.g. in the range of 200 m.

On the one hand, this embodiment illustrates that the power source module and the energy conversion module are separate entities, i.e. facilities, that are comprised by separate buildings or containers.

On the other hand, this embodiment further allows for the power source module to be pre-fabricated and for a swift setup at a data center site or for remodeling of an existing conventional data center.

Similarly, the energy conversion module, when pre-fabricated for example in a container or a pod may be set up in close proximity to a regenerative energy source, which provides an increased flexibility for creating the system according to the invention.

According to another embodiment of the invention, the system is a modular system comprising a plurality of data centers, a plurality of power source modules, particularly in form of first facilities, and one or more energy conversion modules, particularly in form of second facilities, wherein the plurality of power source modules and the one or more energy conversion modules are interconnected by the gas network, and wherein each power source module, particularly each first facility is arranged locally to one of the data centers and connected to the data center of the plurality of data centers, particularly wherein each energy conversion module, particularly each second facility of the one or more energy conversion modules is connected to a local regenerative energy source and the gas network.

Particularly, each energy conversion module is connected to a different local regenerative energy source. For example, the energy conversion module may be collocated to a wind park (wind farm) or a solar module park (solar farm).

Each power source module is connected to the gas network and the one or more energy conversion module(s) is/are connected to the gas network as well.

Each data center in turn is connected to an electricity grid or the electricity grid, wherein each power source module associated to the data center is therefore configured to provide electricity to the data center and to the electricity grid to which the data center is connected, particularly to synchronously provide the electricity to the electricity grid as elaborated in previous embodiments.

This embodiment allows for a scalable system, by adding more power source modules to data centers, e.g. during a remodeling effort, and by collocating more energy conversion modules to regenerative energy sources for generating carbon neutral or carbon negative gas.

According to another embodiment of the invention, the system comprises a heat recovery and distribution system that is configured to export heat recovered from the data center, particularly from a data center server comprised by the data center, and the power source module to a heat exchanger arranged and adapted to export the recovered heat into a district heating system.

This embodiment adds yet another facet of energy handling and sustainability of the system. The system may be even configured to generate electricity for the sake of producing heat at the power source module for distribution to a district heating system.

As many data centers are located in urban areas, a heat transport distance is comparably short, which renders this embodiment as particularly energy efficient.

Heat export is a cost driver. Therefore, heat export or demand could initiate activation of the $2^{nd}$ primary source, i.e. the power source module. This embodiment therefore allows to cover for heating deficits caused by a larger proportion of renewable grid generation which does not have heat as a by-product. Heat exported from a carbon neutral gas operation provides a second use for the energy absorbed by the data center and increases the operating efficiency of the power source module. Heat export also reduces the carbon footprint of a surrounding community or district which otherwise might burn natural gas to meet heating demand.

According to a second aspect of the invention, a method for remodeling a conventional data center to a data center system according to the invention is disclosed, wherein the conventional data center is connected or connectable to the electricity grid as a first prime-rated electricity source, the method comprising the steps of:
- Arranging for a data center system having an energy conversion module connected to the gas network and a local regenerative energy source with the features of any of the preceding embodiments;
- Arranging the power source module with the features of any the embodiments disclosed for the first aspect of the invention, in local proximity to the data center as a second prime-rated electricity source;
- Connecting the power source module to the data center as a second prime-rated electricity source, particularly also connecting the power source module to the gas network and via the data center to the electricity grid;
- Installing a switch configured to control a provision of electricity from the power source module to the to the data center;
- Connecting the power source module and the data center as well as the switch to the data center system according to the invention, such that the system controls the switch and the provision of the electricity from the power source module to the data center, particularly for reducing a load on the electricity grid or supplying electricity to the grid via the data center or for supplying the data center with electricity.

The method of remodeling existing data centers allows for a cost-efficient generation of the data center system according to the invention. As many data centers are powered by the electricity grid as the sole prime-rated electricity source and have a standby-rated electricity source, such as a diesel generator, operation of these data centers places a constant load on an electricity grid with an increasingly variable generation capacity which may periodically have insufficient regenerative energy to supply them, leaves a positive carbon footprint and additionally contributes to air-pollution in urban areas.

Remodeling of such data centers integrates them into the community energy transition, assisting carbon reduction in other sectors and creating a net carbon negative effect for the data center on the surrounding energy system. It also reduces emissions other than carbon, particularly as burning synthetic gas, such as methane or hydrogen does not pollute the air to a degree that burning diesel does.

According to a third aspect of the invention, a method for controlling a data center system according to the invention is disclosed, the method comprising the steps of:
- Determining an amount of gas, e.g. in form of an energy equivalent, produced and fed into the gas network at the energy conversion module;
- Determining an amount of gas consumed, e.g. in form of an energy equivalent at the power source module
- In absence of a supply failure of the electricity grid and in case the amount of gas produced and fed by the energy conversion module is greater than an amount of gas consumed by the power source module, particularly initiating operation of the power source module and providing electricity to the data center to reduce a load on the electricity grid and/or to export electricity to the electricity grid via the data center, particularly wherein electricity is provided to the data center until the amount of gas consumed at the power source module equals the amount of gas produced at the energy conversion module,
- particularly wherein a duration is determined until the produced amount of gas is consumed by the power source module, wherein at the expiry of the duration, the power source module ceases to provide electricity and to consume gas from the gas network to grid stabilizing effect.

The method according to the third aspect of the invention, details an operating principle of the system that allows the system to exhibit a net carbon neutral emission profile, as only the amount of gas e.g. measured in an energy equivalent, generated at the energy conversion center is consumed for generating electricity at the power source module. As the generated gas is generated from regenerative energy sources and binds atmospheric carbon into the gas, burning said gas does not contribute to a net carbon dioxide emission.

Particularly, in order to coordinate the method steps, the control system receives a start signal from an electricity grid operator requesting grid stabilizing. Thus, the order of events may be given as follows: 1) determine an available gas amount and corresponding operation period for converting gas to electricity at the power source module, particularly set a price threshold corresponding with this operating period; 2) receiving a signal from the control system to start providing electricity via the data center to the electricity grid. 4) end the provision of electricity via a further signal from the control system.

The available amount of gas particularly is the amount of gas that has been produced at the energy conversion module and that has not yet been consumed at the power source module.

As the power source module is a prime-rated electricity source, the power source module can run uninterrupted for an essentially unlimited amount of time and contribute to either grid stabilization and/or data center powering.

The amount of gas produced and fed into the gas network at the energy conversion module may be determined with a meter at the energy conversion module. The meter may provide information on the amount of produced gas for the gas network to the control system.

Similarly, the amount of gas consumed at the power source module may be determined with a meter at the power source module. The meter may provide information on the amount of provided by the gas network to the control system.

It is noted that any method aspect of the system according to the invention, in particular any feature of the components of the system according to which the component is configured, adapted or designed to operate may be incorporated as a method step for the method of controlling the system according to the third aspect. In order to control the execution of the method steps, the control system may receive and process information obtained from the components, the electricity grid, such as e.g. an energy demand, electricity and/or gas pricing, the regenerative energy source, such as e.g. demand management, pricing, and the gas network.

At the control system, control commands may be issued to the components of the system causing the energy conversion module to produce gas, the grid battery to charge, discharge to the electricity grid and/or to provide electricity in parallel, particularly synchronously to the gas-powered electricity generator, and the power source module to produce electricity according to the rules set out for the system and method.

The control system particularly allows for controlling the provision of electricity from the grid battery to the electricity grid during the start-up phase of the gas-powered electricity generator, e.g. the reciprocating gas engine. This allows for instantaneous grid stabilization.

Particularly, the grid battery has a capacity such that it may supply 1 to 4 MW, particularly for at least 10 Minutes and not longer than 2 hours.

According to another embodiment of the third aspect, in case of a supply failure of the electricity grid, electricity is provided from the power source module to the data center to maintain data center operation, particularly independently of an available amount of gas.

This allows for completely relying on the power source module as a prime-rated power electricity source. Particularly, in this case, the power source module may generate electricity even though the amount gas generated at the energy conversion module may not cover the amount of gas consumed at the power source module during the failure. The gas imbalance will be tracked by the respective meters and the control system will re-balance the gas volume via production at the energy conversion module following the failure.

According to another embodiment of the third aspect, the method comprises the step of determining a heat demand of a district heating system to bolster a heating capacity, wherein heat generated at the power source module and by the data center, e.g. by the servers is provided to the district heating system in case there is a positive heat demand e.g. by means of the heat recovery and distribution system that is configured to export heat from the power source module to a heat exchanger arranged and adapted to export the recovered heat into the district heating system.

This embodiment of the method elaborates on the incorporation of the heat distribution system as detailed in previous embodiment of the data center system.

It is noted that embodiments, definitions, and features of components or methods steps relating to the first, the second, or the third aspect of the invention are interchangeably applicable to the first, second, and the third aspect. Therefore, advantageous features of components or method steps are equivalently applicable for all aspects of the invention.

BRIEF DESCRIPTION OF THE DRAWINGS

Particularly, exemplary embodiments are described below in conjunction with the Figures. The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the device according to the present invention.

DETAILED DESCRIPTION

Figure 1:
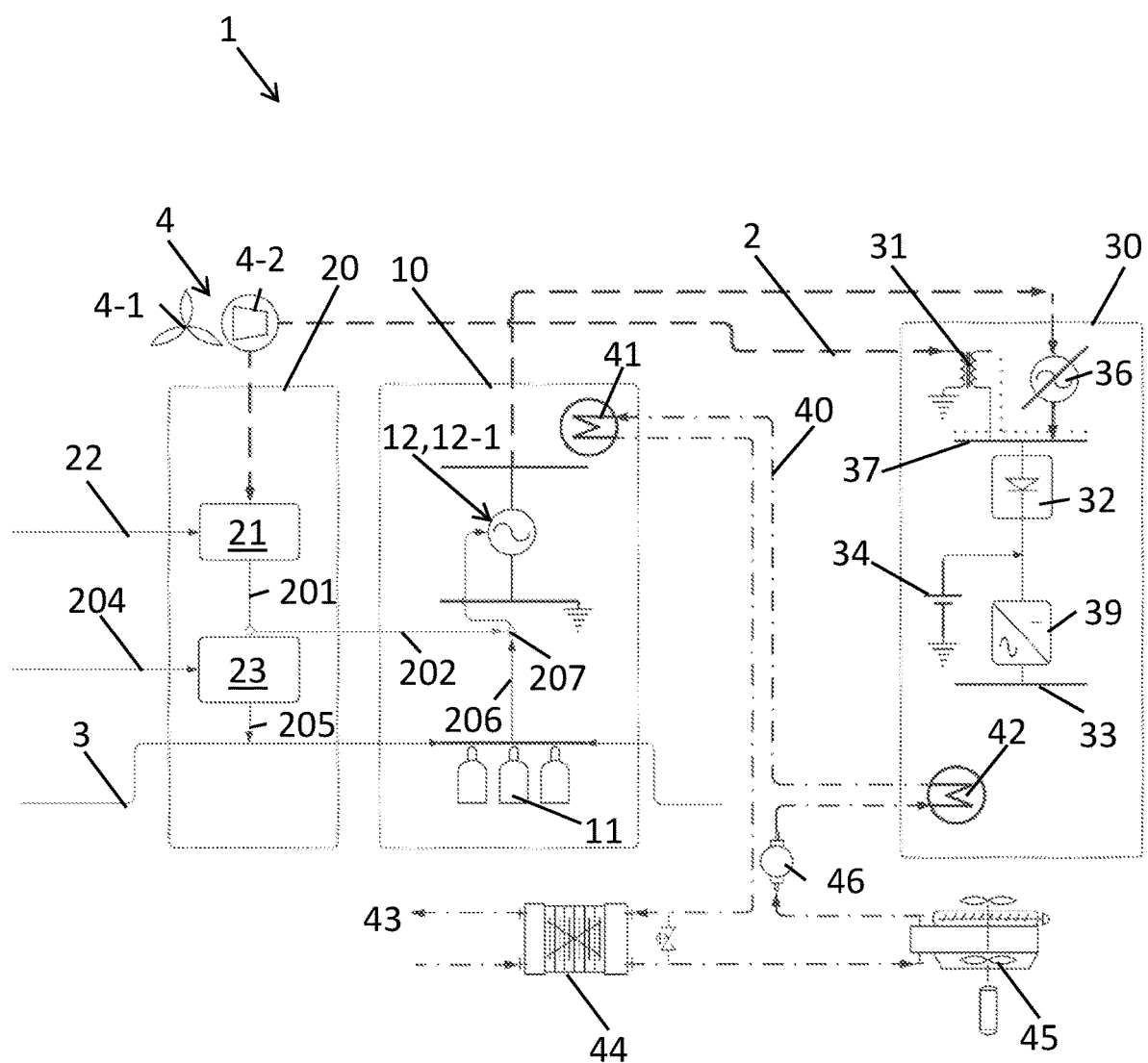
FIG. 1 shows a first exemplary embodiment of the system according to the invention.

In FIGS. 1 to 3 and 6 various exemplary and schematic embodiments of a data center system 1 according to the invention is shown. Common to all embodiments is that the data center system 1 comprises the components of at least one power source module 10, at least one energy conversion module 20 and at least one data center 30. The data center 30 is connected to an electricity grid 2, wherein the electricity grid 2 forms a first prime-rated electricity source of the data center 30. A second prime-rated electricity source is the power source module 10, which is connected as well to the data center 30.

Figure 2:
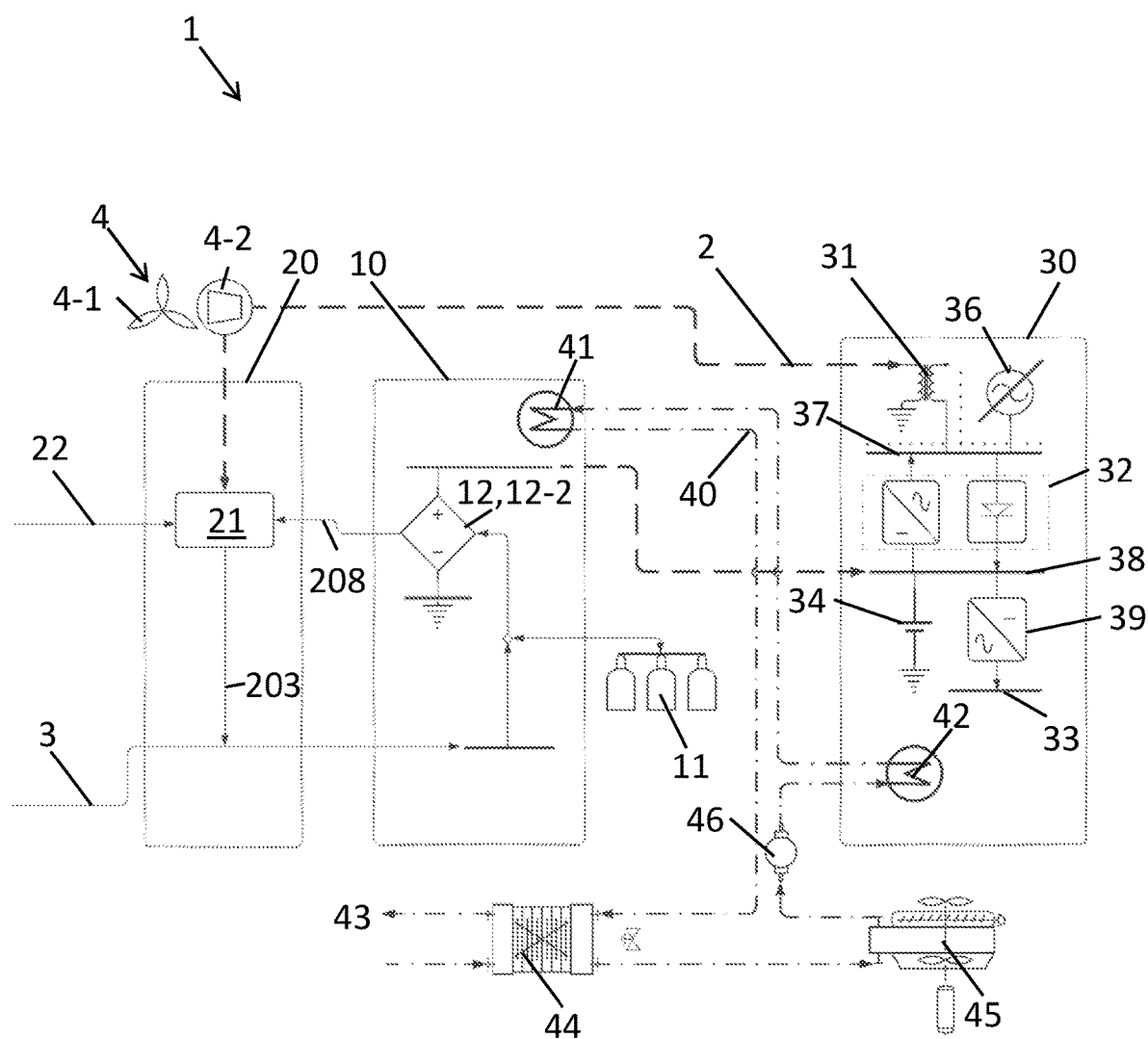
FIG. 2 shows a second exemplary embodiment of the system according to the invention.
Figure 3:
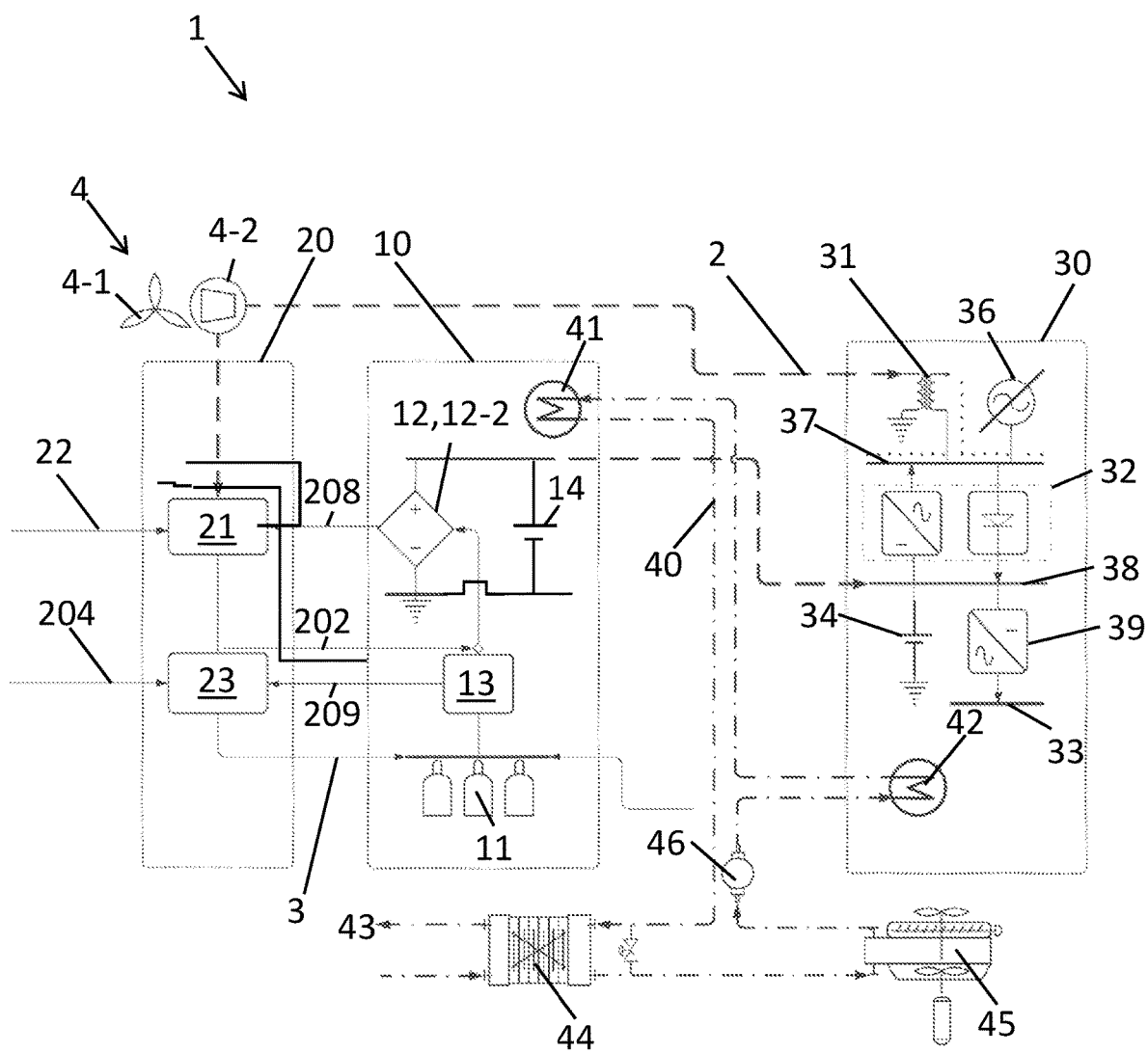
FIG. 3 shows a third exemplary embodiment of the system according to the invention.

The first prime-rated electricity source may be powered by electricity that is for example obtained from burning fossil fuel or natural gas but as well by electricity that comes from so-called renewable or regenerative energy power sources. Thus, typically the electricity grid 2 provides a mix of electricity generated from renewable and fossil or non-regenerative energy sources. For example, by way of policy, it is possible that electricity provided from the electricity grid 2 is accounted to regeneratively generated electricity and thus the carbon footprint of electricity consumption by the data center 30 results in net neutral system operation. This situation is depicted in FIGS. 1 to 3.

The power source module 10 is connected to a gas network 3 that typically provides a blended gas mix, comprising methane with 0% to 25% hydrogen mixed thereto to the power source module. Optionally, a local gas storage 11 is located at the power source module 10, such that even in case a gas network 3 failure, the power source module 10 is operable.

Depending on the specific design of the power source module 10, the local gas storage 11 may comprise methane or hydrogen as the stored gas.

The gas storage 11 may be comprised by the power source module 10. The power source module 10 is located in a proximity to the data center 30, such that for example remodeling of an existing data center 30 (e.g. having a diesel generator 36) is possible. For this purpose, the power source module 10 may be comprised in a container or pod, in which it is pre-fabricated, such that the on-site installation of the power source module 10 is particularly facile.

The power source module 10 comprises a gas-powered electricity generator 12 adapted and configured to burn or convert the gas from the gas network 3 and/or the local gas storage 11 to electricity and to produce electricity for unlimited time intervals and under varying loads, such that said power source module 10 qualifies as a prime-rated electricity source. Depending on the kind of generator 12, the electricity is either DC or AC.

The power source module 10 is electrically connected to the data center 30. The connection depends on the kind of electricity the power source module 10 provides to the data center 30.

The data center 30 may comprise various components configured to rectify or convert the electricity from the power source module 10 from AC to DC or vice versa, such as a bidirectional converter 32. Further, the data center 30 may comprise components that allow to synchronize the electricity to the frequency and phase of the electricity provided by electricity grid 2.

This allows to use the electricity from the power source module 10, to stabilize the electricity grid 2, e.g. by feeding the electricity to the grid 2 or by supplying the data center 30 with electricity, in both cases reducing the load from the electricity grid 2.

The power source module 10 therefore stabilizes the grid 2 particularly only via the data center 30 connection 37 with the electricity grid 2.

The power source module 10 may comprise a meter (not shown) for measuring and recording an amount of gas that has been taken from the gas network 3 and/or the local gas storage 11 as well as a meter (not shown) for measuring the amount of generated electricity.

The energy conversion module 20 is connected to at least one regenerative energy source 4, such as a wind turbine or a wind park 4-1, a solar park 4-2 or a solar module. Other regenerative energy sources are possible, such as a tidal plant, a geothermal plant etc. (not shown). The energy conversion module 20 is further connected to the gas network 3 and may comprise a meter for measuring the produced gas and the converted electricity.

Similar to the power source module 10, the energy conversion module may be comprised in a container or pod, in which it is pre-fabricated, such that the on-site installation of the energy conversion module 20 is particularly facile.

The energy conversion module 20 is located in a vicinity of the regenerative energy source 4 in order to reduce any losses of electricity generated at the regenerative energy source 4. As the electricity generation of the regenerative energy source 4 typically depends on external circumstance, e.g. weather conditions, or the tide, the energy conversion module 20 is designed to power-up or ramp up from a minimum operating capacity any time there is a surplus of electricity generated at the regenerative energy source 4.

The energy conversion module 20 converts the electricity from the regenerative energy source 4 into gas. The gas may be methane, i.e. synthetic gas, or hydrogen or a mixture thereof. For this purpose, the energy conversion module 20—in any case—comprises an electrolyzer 21 for transforming electricity from the regenerative source 4 to hydrogen. This is achieved by the additional intake of water from at least one water source 22.

The produced hydrogen 201 may be used for feeding the hydrogen via a hydrogen connection 203 into the gas network 3 (cf. FIG. 2) or to directly supply 202 the power source module 10 in case the power source module is close to the energy conversion module 20 (cf. FIGS. 1 and 3). The latter may be achieved by a separate connection 202 to the power source module 10.

The energy conversion module 20 is configured to feed the gas into the gas network 3. The gas network 3 in essence serves as a gas storage and an energy storage.

The energy conversion module 20 is configured to produce hydrogen and/or (synthetic) methane in case of an excess or surplus of regeneratively produced electricity relative to grid 2 demand, demand management, curtailment of the regenerative energy source from the grid 2 or market price changes in favor of green gas or hydrogen production.

The data center 30 comprises a connection 31 to the electricity grid 2. The data center 30 comprises a bi-directional converter or rectifier 32 that allows to convert AC electricity from the electricity grid 2 to DC electricity and/or vice versa for grid stabilization.

In FIGS. 1 to 3 a previous standby electricity source 36, e.g. a diesel generator, is shown (crossed out) to illustrate state of the art data center electricity supplies that are based on a connection to the electricity grid as the sole prime-rated electricity source and the diesel generator for fail-safe electricity supply.

The data center 30 further comprises a data server 33 and/or data storage 33 that is connected to the data network (not shown) to serve the purpose of the data center 30.

In addition, the data center 30 comprises an uninterruptible power source (UPS) 34 that comprises a battery assembly. The UPS 34 is configured to act as a fail-safe electricity source for the data center 30, in case both prime-rated electricity sources would fail at the same time.

The UPS 34 may be charged with DC electricity from the bi-directional converter 32/rectifier (cf. FIG. 1) or more directly by DC electricity provided by a DC power source module 10 (cf. FIGS. 2 and 3).

In some embodiments the data center 30 is connected to the system 1 via a converter 39 (cf FIG. 1). The converter 39 and UPS 34 may be connected to the power source module via a DC-rail 38 (cf. FIGS. 2 and 3).

The data center system 1 may optionally comprise a heat recovery and distribution system 40 that is configured to export heat recovered from the data center 30, particularly from the data center server 33 comprised by the data center, and the power source module 10 to a heat exchanger 41, 42, arranged and adapted to export the recovered heat into a district heating system 43.

The heat recovery system 40 further comprises a pump 46 for pumping a heat exchange liquid through the system 40, such that the heat exchangers 41, 42 take up the heat and such that the heat is transported further to an exchanging system 44 for the district heating system 43.

The heat exchanger 41 at the power source module 10 is particularly located at the gas-powered electricity generator 12.

As many data centers 30 are located in urban areas, a heat transport distance to the district heating system 43 is comparably short.

Similarly, as the power source module 10 is located in proximity of the data center 30, the heat recovery system 40 can be built comparably compact. The recovery system 40 may comprise an additional means for dissipating remaining heat or a reservoir of colder heat exchange liquid 45.

This optional heat recovery system 40 allows for using dissipated heat from the data center 30 and the power source module 10 for district heating rather than solely dissipating the heat to the surrounding.

The system 1 according to the invention can be driven in a zero-carbon emission mode, such that during operation the net carbon dioxide production is zero or below zero.

Now, turning specifically to the embodiment of the system as shown in FIG. 1, the energy conversion module 20 comprises the electrolyzer 21 configured to transform electricity from the regenerative energy source 4 to hydrogen. In addition, the energy conversion module 20 comprises a methanation plant 23 that is connected to the electrolyzer 21 to receive the generated hydrogen 201. The methanation plant 23 using carbon dioxide and/or carbon monoxide transforms the hydrogen into methane, i.e. synthetic gas. The carbon dioxide and/or carbon monoxide may be obtained from a direct capture facility (not shown) to which the energy conversion module 20 and in particular the methanation plant 23 comprised therein is connected 204.

The methane is provided to the gas network 2 by means of a methane connection 205.

The energy conversion module 20 may also be connected to a biogas facility (not shown) and configured to feed the biogas into the gas network 2.

The embodiment shown in FIG. 1 allows the provision of methane to the gas network 2 and simultaneously or alternatively the provision of hydrogen to the power source module 10 by means of the separate connection 202. The separate connection 202 is an optional component, which may be realized in case a proximity of the energy conversion module 20 and power source module 10 is sufficiently close.

FIG. 1 further illustrates a variant of the power source module 10 that comprises a reciprocating gas engine 12-1 as the gas-powered electricity generator 12. The reciprocating gas engine 12-1 is configured to burn gas from the gas network 3 and to produce AC electricity from this process. The reciprocating gas engine 12-1 is configured to burn methane, hydrogen or a mixture thereof. Further, particularly as the gas is supplied from the local gas storage, which stores butane and/or propane, the reciprocating gas engine 12-1 may be configured to also combust said gases. In the exemplary embodiment shown in FIG. 1 the gas provided to the reciprocating gas engine 12-1 is methane or blended gas, i.e. methane with 0% to 25% hydrogen or even pure hydrogen. The local gas storage 11 in the embodiment depicted in FIG. 1 comprises methane.

Blending of the gas may be facilitated at the power source module 10 by mixing the gas inputs of 202 and 206 at a mixer 207, or wherein the gas from the gas network 3 may already comprise a methane hydrogen mix.

Using a reciprocating gas engine 12-1 as the electricity generating source of the power source module 10, allows for producing AC electricity that is then provided to the data center 30 via the same connection that may have been used before by the standby electricity source 36. The AC electricity is provided synchronous to the AC electricity provided by the electricity grid 2. For this purpose, the system 1 comprises appropriate means. Providing the electricity in synch with the electricity grid 2 allows for stabilizing the electricity grid via the data center 30. As can be seen, the electricity from the electricity grid 2 and the electricity from the power source module 10 share, i.e. are connected to a common conducting element 37 that enables grid stabilization with synched electricity sources at the data center 30. The common conducting element 37 is connected to the bidirectional converter 32 or rectifier 32 that transforms the AC electricity to DC electricity, which may be used to charge the UPS or that may be used for powering the data center's 10 components, such as the data server 33.

Due to the modular nature of the system 1, the power source module 10 is configured to generate electricity in the range from 0.5 MW to 2.5 MW per module, which on the one hand ensures that the power source module 10 qualifies as a prime-rated electricity source and on the other hand allows for arranging the power source module 10 in the vicinity of an existing data center 30, particularly in urban areas, where space limits sizes of power source modules particularly in terms of space constraints, and further in terms of heat generating, noise and/or pollution limitations.

As the power source module 10 is comparably small, the system 1 may be expanded and scaled by connecting more power source modules to more data centers. Particularly, each data center 30 may be provided and equipped with its own power source module 10 or a plurality of modules (cf FIG. 5).

In the following, differences or additional components of the system 1 as described in the context of the previous Figures and examples are detailed. To reduce redundancy, components that remain essentially unchanged will not be addressed again.

FIG. 2 depicts an exemplary embodiment of the invention, wherein the energy conversion module 20 solely comprises the electrolyzer 21 and no methanation plant. The hydrogen produced by the electrolyzer 21 is fed into the gas network 3 via connection 203. The gas network 3 may be configured to transport blended gas, i.e. methane and hydrogen, or pure hydrogen. Depending on the proximity of the energy conversion module 20 to the power source module 10, the power source module 10 may provide recovered water to the energy conversion module 20 via a separate connection 208. In the specific embodiment of FIG. 2, the gas network 3 is a hydrogen gas network 3.

The power source module 10, in contrast to the embodiment shown in FIG. 1, uses a fuel cell 12-2 as the gas-powered electricity generator 12.

The fuel cell 12-2 is connected to the hydrogen gas network 3 and is provided either via said gas network 3 or the local gas storage 11, which is a hydrogen gas storage in the located outside of the power source module 10, with (pure) hydrogen. The fuel cell 12-2 may be a proton-exchange membrane fuel cell (PEMFC)—also known as polymer electrolyte membrane fuel cell. This kind of fuel cell is very compact and light weight, has low operating core temperatures of <100° C. and is able to rapidly accept load.

Due to the nature of the fuel cell 12-2 the produced electricity is DC electricity. For this reason, the connection with the data center 30 is down-stream the bidirectional converter 32 of the data center 30. This allows to directly charge the UPS 34, to power the data center 30 or to the convert the DC electricity to AC electricity via the bi-directional converter 32 such as to use the converted and synchronized AC electricity for grid stabilization via the common conducting element 37 upstream the bi-directional converter 32.

As fuels cells are devoid of any moving parts, this embodiment provides a robust and sustainable data center system 1 with very low noise, vibration, particle, and gas emissions. Furthermore, this embodiment allows for the adaption and direct use of a hydrogen gas network.

FIG. 3 shows a variation of the invention, wherein in this example, the energy conversion module 20 comprises the methanation plant 23 and has in essence the same layout as the energy conversion module 20 as already detailed in FIG. 1. In addition to the energy conversion module 20 of FIG. 1, the energy conversion module 20 in FIG. 3 is optionally connected to a methane reformer 13 comprised in the power source module 10. The connection 209 provides carbon dioxide generated in the process of reformation to the methanation plant 23.

The reformer 13 allows to convert the methane for the gas network 3 to hydrogen that may then be used by the fuel cell 12-2 of the power source module 10. Optionally, the energy conversion module 20 may provide pure hydrogen via the separate connection 202 to the power source module 10 in case the energy conversion module 20 and the power source module 10 are located close to each other.

The power source module 10 further comprises a back-up battery assembly 14 for storing electricity, particularly for compensating sudden load changes on the power source module 10. The back-up battery assembly 14 is also referred to as grid battery 14 in the context of the current specification. The grid battery 14 is connected to the power source module 10 and may be even comprised by the power source module 10. The grid battery 14 is particularly configured to provide electricity during times, when the gas-powered electricity generator 12, in the example of FIG. 3 the fuel cell 12-2, is ramping-up electricity generation, which might take several minutes. The grid battery 14 in turn is configured to and capable of instantaneously provide electricity within seconds and thus allows complementing and even substituting the electricity generated by the fuel-cell 12-2, and more general the gas-powered electricity generator 12, during a start-up phase, when electricity support is required e.g. for stabilizing the electricity grid 2. The grid battery 14 may be used in combination with the reciprocating gas engine 12-1 just as well in an analogue fashion (as for example shown in FIG. 6).

The grid battery 14 may be a battery assembly and/or be comprised by the UPS (not shown). In case the grid battery is comprised by the UPS, the grid battery may be connected to the power source module via a DC-rail 38 to the power source module 10.

Figure 4:
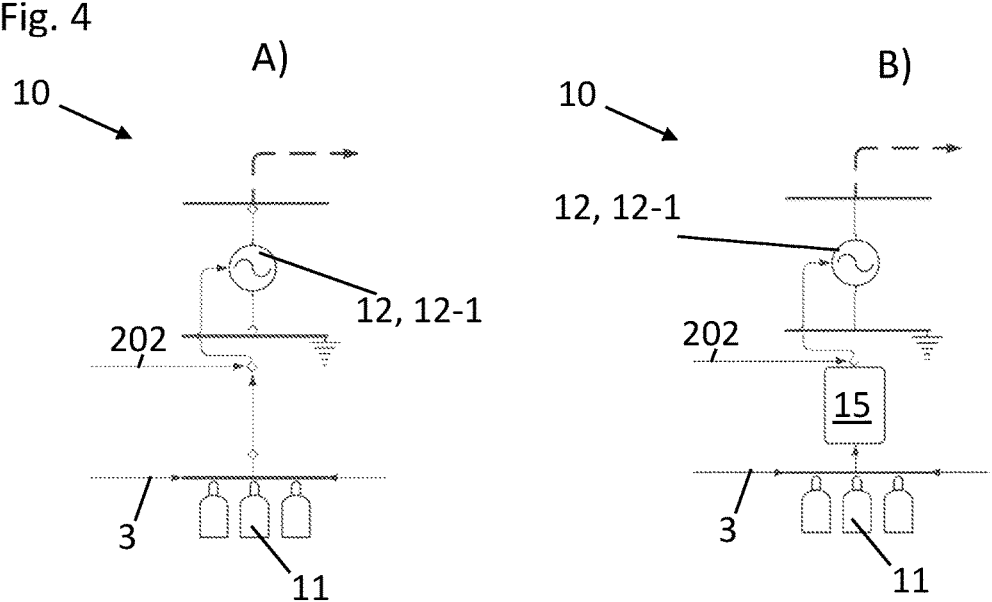
FIG. 4 shows exemplary embodiments of the power source module with a reciprocating gas engine.

In case the gas network 3 provides a mix of methane and hydrogen, it is also possible that instead of a methane reformer 13, a membrane filter in combination with a PSA filter (cf. FIG. 4) is used for extracting pure hydrogen from the gas mix provided by the gas network 3.

FIGS. 4A and B show similar embodiments of the power source module 10 comprising the reciprocating gas engine 12-1. In FIG. 4A, the reciprocating gas engine 12-1 is configured to run on methane and/or a mix of methane and hydrogen—and particularly even on LPG stored in the local gas storage 11. In FIG. 4B, the reciprocating gas engine is configured to run on pure hydrogen. For this purpose, in case the gas network 3 is a mixed gas network 3, the power source module 10 comprises a filter assembly 15, with a membrane and/or a PSA filter, that extract the hydrogen from the gas mix, such that the reciprocating gas engine 12-1 is provided with pure hydrogen. For some reciprocating gas engines configured to combust hydrogen, it is sufficient that the filter assembly 15 solely comprises the membrane filter, as the reciprocating gas engine may not require hydrogen of particular high purity.

Figure 5:
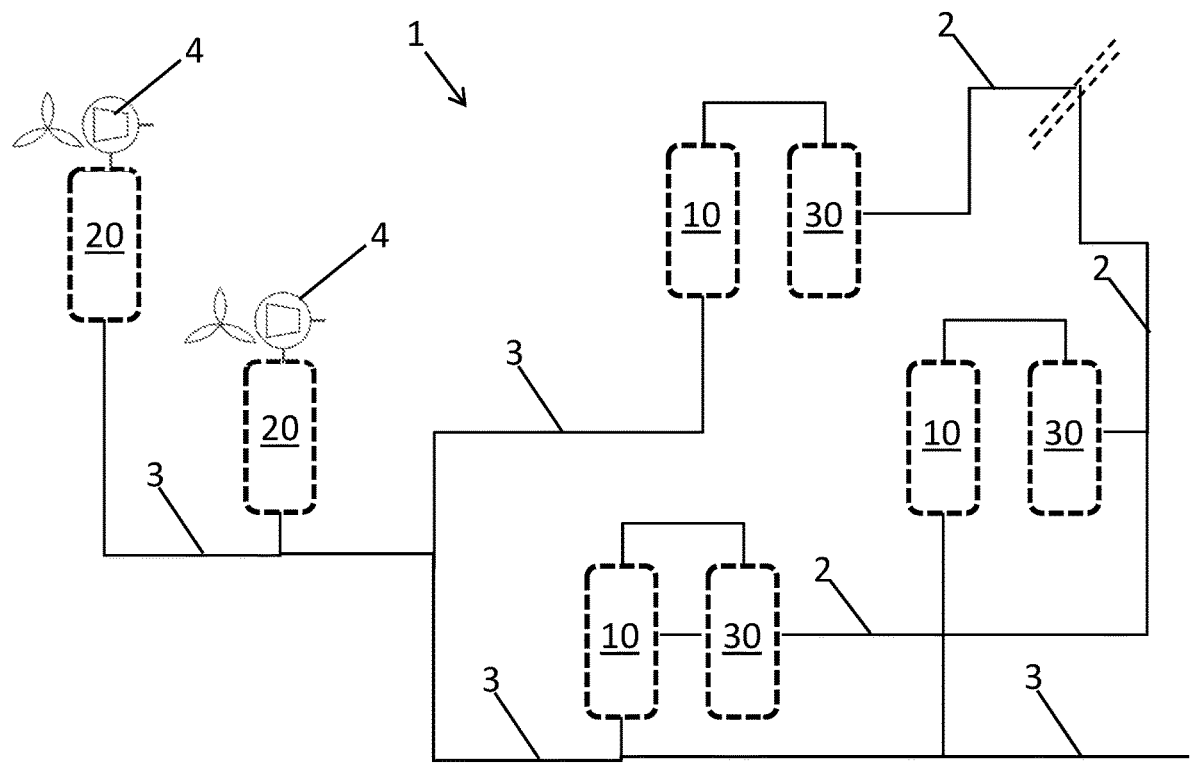
FIG. 5 shows an embodiment comprising a plurality of power source modules and data centers.

FIG. 5 shows an embodiment of the system 1 that comprises plurality of power source modules 10 and data centers 30 as well as two energy conversion modules 20.

This example illustrates the scalability of the system 1 and the possibility to successively transform an existing conventionally powered data center infrastructure to the system 1 according to the invention to incorporate the data centers in a carbon neutral data center system 1.

Figure 6:
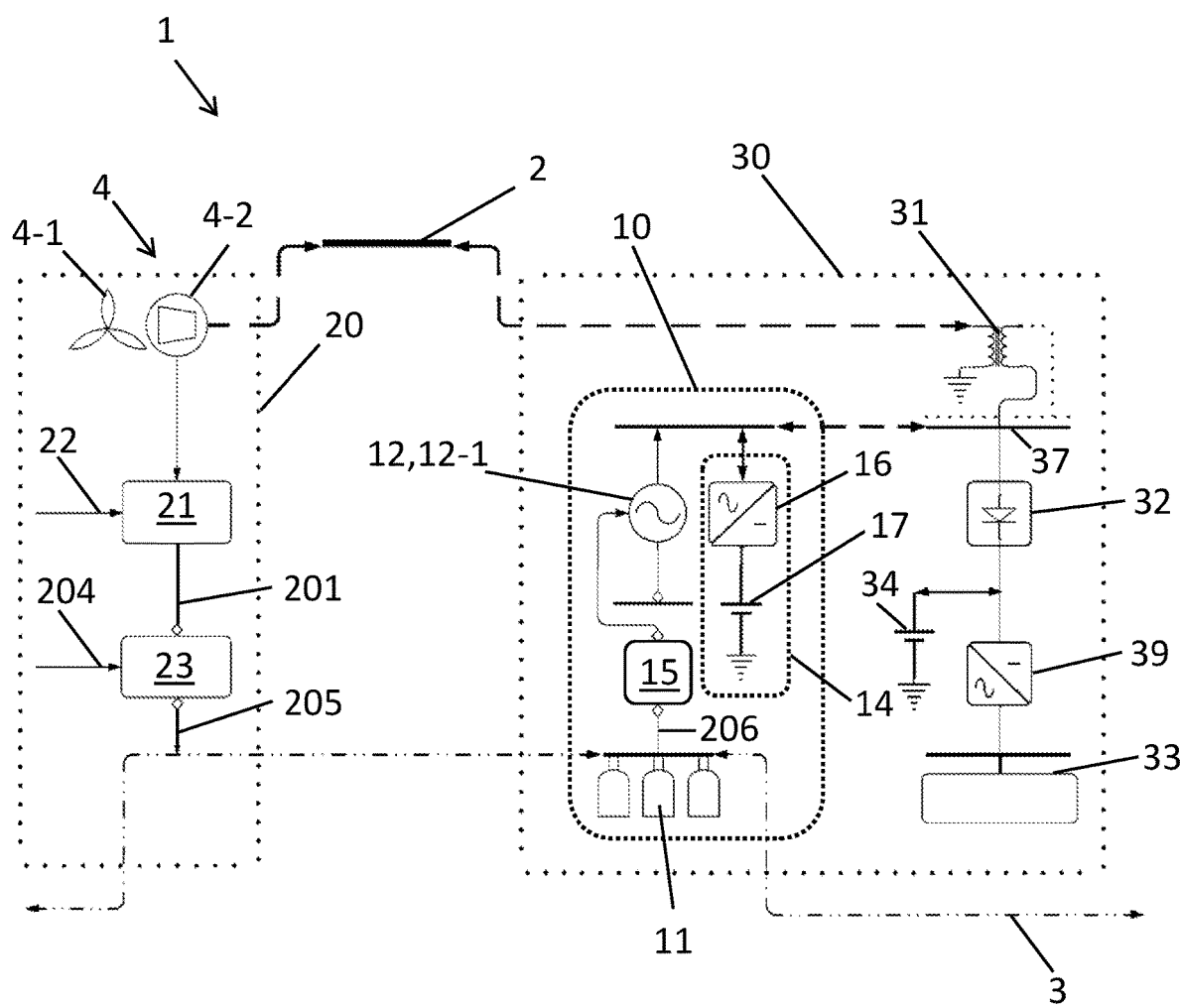
FIG. 6 shows a fourth exemplary embodiment of the system according to the invention.

FIG. 6 shows a similar embodiment to FIG. 1. Identical reference signs refer to the same features and components as in FIG. 1.

In the following the main differences to the embodiment of FIG. 1 will be highlighted. In the embodiment of FIG. 6, the power source module 10 is located in the data center 30, i.e. the power source module 10 is comprised by the data center 30. That is the power source module 10 provides electricity to the data center nonetheless, while it is physically included in the data center 30.

One of the main differences to the embodiment of FIG. 1 is that the power source module comprises an AC grid battery 14, which in turn includes a DC battery 17 connected to a bi-directional inverter 16, which allows conversion of the DC electricity provided by the DC battery 17 to AC electricity and for charging the DC battery using the AC electricity provided via the bi-directional inverter 16. The AC grid battery 14 is configured such that in case an electricity is provided from the DC battery 17 the converted electricity is synchronous to the electricity of the electricity grid and/or the reciprocating gas engine 12-1. This function may be achieved by selecting the appropriate bi-directional inverter 17.

The AC grid battery 14 at the power source module 10 allows for essentially instantaneous electricity provision and generation by the power source module 10 for example in case the electricity grid 2 and/or the data center 30 experiences a sudden load change. The reciprocating gas engine 12-1 while having the advantage of virtually unlimited run time/capacity, suffers from a start-up time which is required for the reciprocating gas engine 12-1 to convert gas to electricity in a stable fashion and to provide the electricity to the grid or the data center in a sufficient amount. During this start-up time, which may be in the order of several minutes, e.g. up to 15 minutes, the AC grid battery assumes the provision of the required electricity, such that even under sudden and rapid load changes the electricity grid 2 may be stabilized or the data center will be provided by the prime-rated energy source with electricity by the power source module 10.

The interplay between the reciprocating gas engine 12-1 and the AC grid battery may be controlled by a controller or the control module, which may be as well configured to determine the required electricity.

The power source module 10 may optionally comprise the filter assembly 15, with a membrane and/or a PSA filter, that is configured to extract the hydrogen from the gas mix, such that the reciprocating gas engine 12-1 is provided with pure hydrogen (in case the reciprocating gas engine runs on hydrogen). For some reciprocating gas engines configured to combust hydrogen, it is sufficient that the filter assembly 15 solely comprises the membrane filter, as the reciprocating gas engine may not require hydrogen of particular high purity.

The invention claimed is:

1. A data center system (1), comprising at least the following components: a data center (30), a power source module (10), and an energy conversion module (20), wherein the data center (30) is connected to at least two prime-rated electricity sources configured to provide electricity to the data center (30), wherein a first electricity source is an electricity grid (2) and wherein a second electricity source is the power source module (10), wherein the power source module (10) comprises a gas-powered electricity generator (12, 12-1, 12-2) to generate electricity from gas, wherein the power source module (10) is connected to a gas network (3), wherein the power source module (10) is further connected to the data center (30), wherein the energy conversion module (20) is connected to a regenerative energy source (4) configured to produce electricity, as well as to the gas network (3), wherein the energy conversion module (20) is configured to generate gas, comprising or consisting of hydrogen and/or methane using electricity from the regenerative energy source (4), wherein the energy conversion module (20) is configured to feed the generated gas into the gas network (3), wherein, the system (1) is configured to provide electricity from the power source module (10) to the data center (30), wherein the system (1) is configured to provide electricity from the power source module (10) via the data center (30) synchronously to the electricity provided by the electricity grid (2), wherein the electricity grid (2) is connected to a common conducting element (37) that is connected upstream to a bi-directional converter (32) of the data center (10), wherein the power source module (10) comprises a reciprocating gas engine (12-1) configured to burn gas provided to the power source module (10) to generate AC-electricity, wherein the power source module (10) is connected to the common conducting element (37).

2. The system (1) according to claim 1, wherein the energy conversion module (20) comprises a methanation plant (23) configured to convert hydrogen to methane that is fed into the gas network (3).

3. The system (1) according to claim 1, wherein the system (1) comprises a grid battery (14) configured to store and to instantaneously supply electricity to the electricity grid (2) during start-up times of the gas-powered electricity generator (12) of the power source module (10).

4. The system (1) according to claim 3, wherein the grid battery (14) is connected to and/or comprised by the power source module (10).

5. The system according to claim 3, wherein the data center (30) further comprises a standby electricity source in form of an uninterruptible power source (34, UPS), wherein the grid battery (14) is comprised by the UPS (34).

6. The system (1) according to claim 1, wherein the power source module (10) is comprised in a first facility, wherein the energy conversion module (20) is comprised in a second facility.

7. The system (1) according to claim 6, wherein the system (1) is a modular system (1) comprising a plurality of data centers (30), a plurality of first facilities (10), and one or more second facilities (20) that are interconnected by the gas network (3), and wherein each first facility (10) is arranged locally and connected to one of the data centers (30) of the plurality of data centers (30), wherein the energy conversion module (20) is arranged in a proximity of the regenerative energy source or wherein the energy conversion module (20) is collocated with the regenerative energy source.

8. The system (1) according to claim 7, wherein each data center (30) is connected to the electricity grid (2), wherein each power source module (10) associated to the data center (30) is configured to provide electricity to the data center (30) and to the electricity grid (2) to which the data center (30) is connected to synchronously provide the electricity to the electricity grid (2).

\* \* \* \* \*